United States Patent
Schwoerer

[19]

[11] Patent Number: 5,906,471
[45] Date of Patent: May 25, 1999

[54] SELF PROPELLED BEDDING DISPENSER VEHICLE

[76] Inventor: Larry J. Schwoerer, 7552 Highway V V, Sun Prairie, Wis. 53590

[21] Appl. No.: 08/753,690

[22] Filed: Nov. 27, 1996

[51] Int. Cl.⁶ ................................................ B65G 67/24
[52] U.S. Cl. ........................ 414/505; 222/413; 222/533; 414/523; 414/526
[58] Field of Search .................................. 222/412, 413, 222/415, 608, 526, 529, 533, 536; 414/503, 502, 326, 505, 523, 526

[56] References Cited

U.S. PATENT DOCUMENTS

| | | |
|---|---|---|
| 2,730,256 | 1/1956 | Louden et al. . |
| 4,174,740 | 11/1979 | Tobler ................................... 414/505 X |
| 4,742,938 | 5/1988 | Niewold ............................... 222/413 X |
| 5,257,893 | 11/1993 | Sevits .................................... 222/529 X |
| 5,465,829 | 11/1995 | Kruse .................................... 414/526 X |
| 5,718,556 | 2/1998 | Forsyth ................................ 414/523 X |
| 5,785,481 | 7/1998 | Ockels ..................................... 414/523 |

*Primary Examiner*—Kevin P. Shaver
*Attorney, Agent, or Firm*—DeWitt Ross & Stevens S.C.

[57] ABSTRACT

A vehicle has a mixing bin with a discharge chute, with or without a discharge door. An adjustable duct assembly in communication with the discharge chute has a second chute. Bedding materials are mixed in the bin, discharged through the discharge chute, and mechanically moved through the duct assembly to the second chute.

3 Claims, 3 Drawing Sheets

SELF PROPELLED BEDDING DISPENSER VEHICLE

BACKGROUND—FIELD OF INVENTION

This invention relates to farm machinery, specifically to a vehicle designed to install bedding materials for farm animals.

BACKGROUND—DESCRIPTION OF PRIOR ART

Farm animals are housed in stalls which require bedding materials for the health and comfort of the animals. The bedding must be changed on a frequent basis to preserve the health of the animals. Farms currently work on tight budgets and farmers are not always able to hire as many workers as are truly needed. It can take a number of workers a substantial portion of time to change the bedding in the stalls. A large portion of the time changing the bedding is devoted to installing new bedding materials. When done by hand it can take multiple workers hours to complete the installation of new bedding materials. Part of this time is spent mixing various combinations of materials that are used to maximize the comfort and health benefits to the animals.

What is needed is an easily maneuverable vehicle, operated by one worker, that can mix, hold, carry and distribute bedding materials.

SUMMARY

The self propelled bedding dispenser vehicle of the present invention includes a vehicle with an attached mixing bin which has a discharge chute. An adjustable duct assembly extends from the discharge chute. The bedding materials are mechanically conveyed through the duct assembly to a discharge opening. Because the duct assembly is adjustable, the discharge opening can be positioned such that the bedding materials are discharged directly into the animal's bedding area.

In a second embodiment, the mixing bin discharge chute has a discharge door so that bedding materials may be mixed with the discharge door closed. The discharge door can then be opened so that the bedding materials enter the duct assembly.

An additional feature of the invention is that the bedding materials can be mixed and distributed mechanically, reducing the number of workers and man-hours required to install the bedding materials.

In the preferred embodiment of the invention, hydraulic controls for the mixing bin, adjustable duct assembly, and augers are spliced into the hydraulic system of a modified skidsteer type vehicle. Controls are then run into the cab of the vehicle so that movement of all mechanical parts can be achieved from the cab of the vehicle, further reducing man-hours required. Because bedding materials can be distributed while the operator is inside the vehicle, the operator is sheltered from cold or otherwise inclement weather conditions.

DETAILED DESCRIPTION OF DRAWINGS

Figure 1:
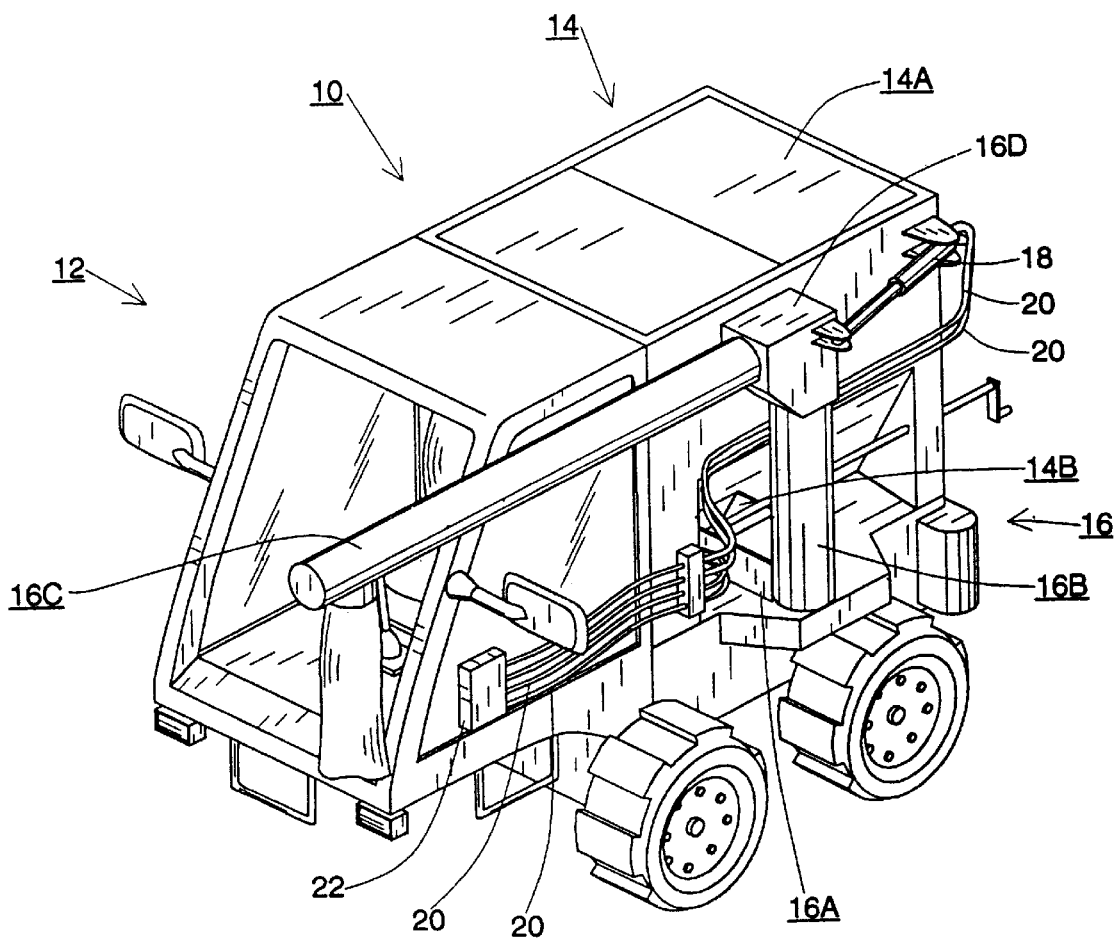
FIG. 1 is a perspective view of the self propelled bedding dispenser vehicle.

FIG. 1 is a perspective view of a self propelled bedding dispenser vehicle 10. The vehicle 10 includes a cab 12, a mixing bin 14, and a duct assembly 16. Mixing bin 14 includes a loading door 14A positioned on top of the mixing bin 14. A discharge chute 14B is located along the bottom of a side of the mixing bin 14. An end of the first duct 16A is positioned proximate to the discharge chute 14B such that discharged bedding materials enter the duct assembly 16 through the discharge chute 14B.

Rotating duct 16B is positioned vertically and connected to duct 16A such that duct 16B may rotate around a vertical axis. Dispensing duct 16C is positioned horizontally and is fixedly connected to duct 16B by joint 16D. Duct 16C is shown positioned in alignment with the vehicle 10, allowing greater mobility potential through narrow doorways. A piston 18 is pivotally attached to both the joint 16D and the mixing bin 14 such that extension and retraction of the piston 18 exerts a rotational force on the duct 16B. As duct 16B rotates, duct 16C is moved radially in a horizontal plane allowing the duct 16C to be disposed outwardly from the vehicle 10 for the purpose of dispensing bedding materials.

FIG. 1 further shows hydraulic lines 20 connected to a control panel 22 positioned in communication with the interior of the cab 12.

Figure 2:
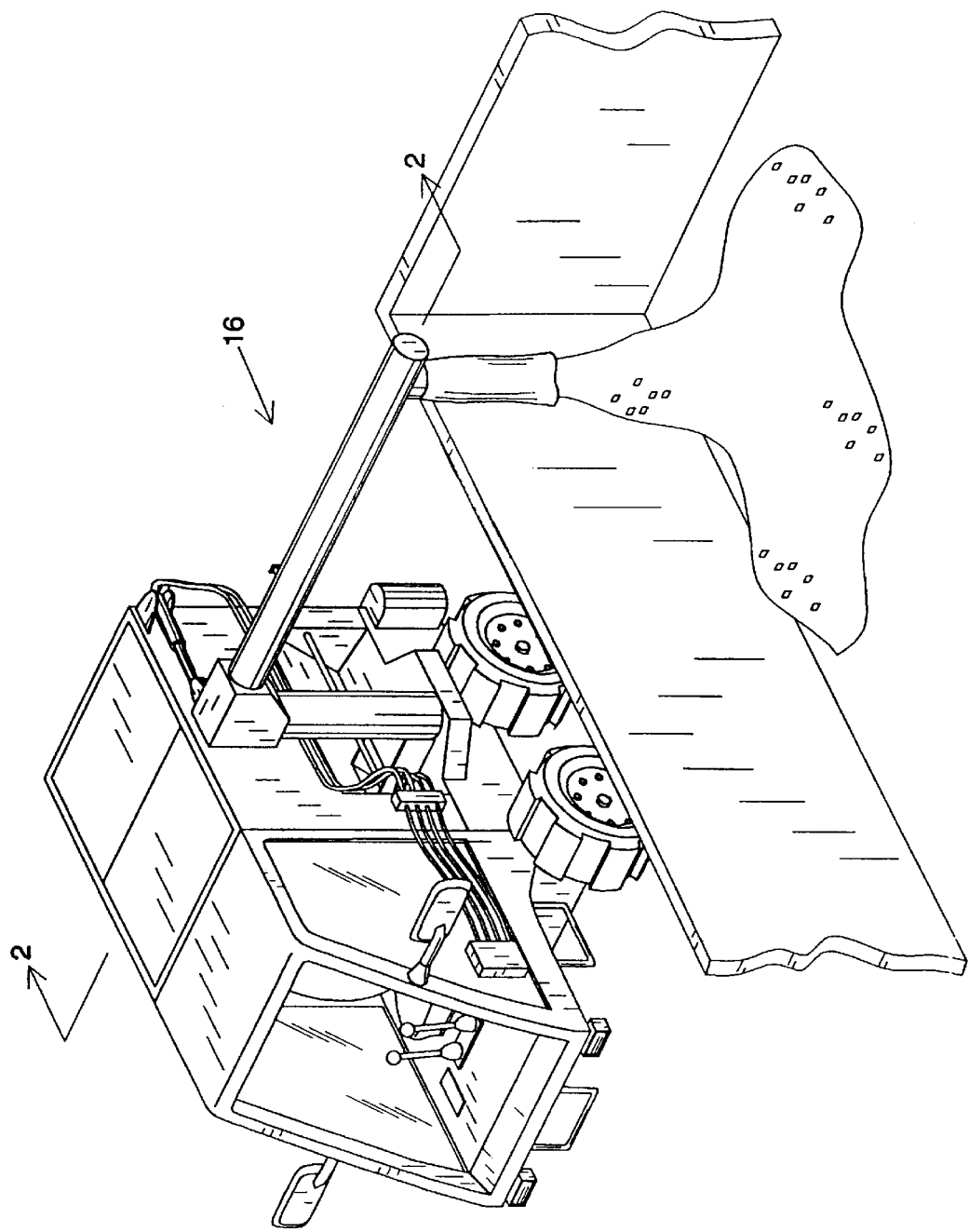
FIG. 2 is a perspective view of the self propelled bedding dispenser vehicle with duct assembly in an extended position.

FIG. 2 shows a perspective view of the vehicle 10 with the dispensing duct 16C extended outward from the vehicle 10 so that bedding materials may be dispensed into a stall adjacent to the vehicle 10.

Figure 3:
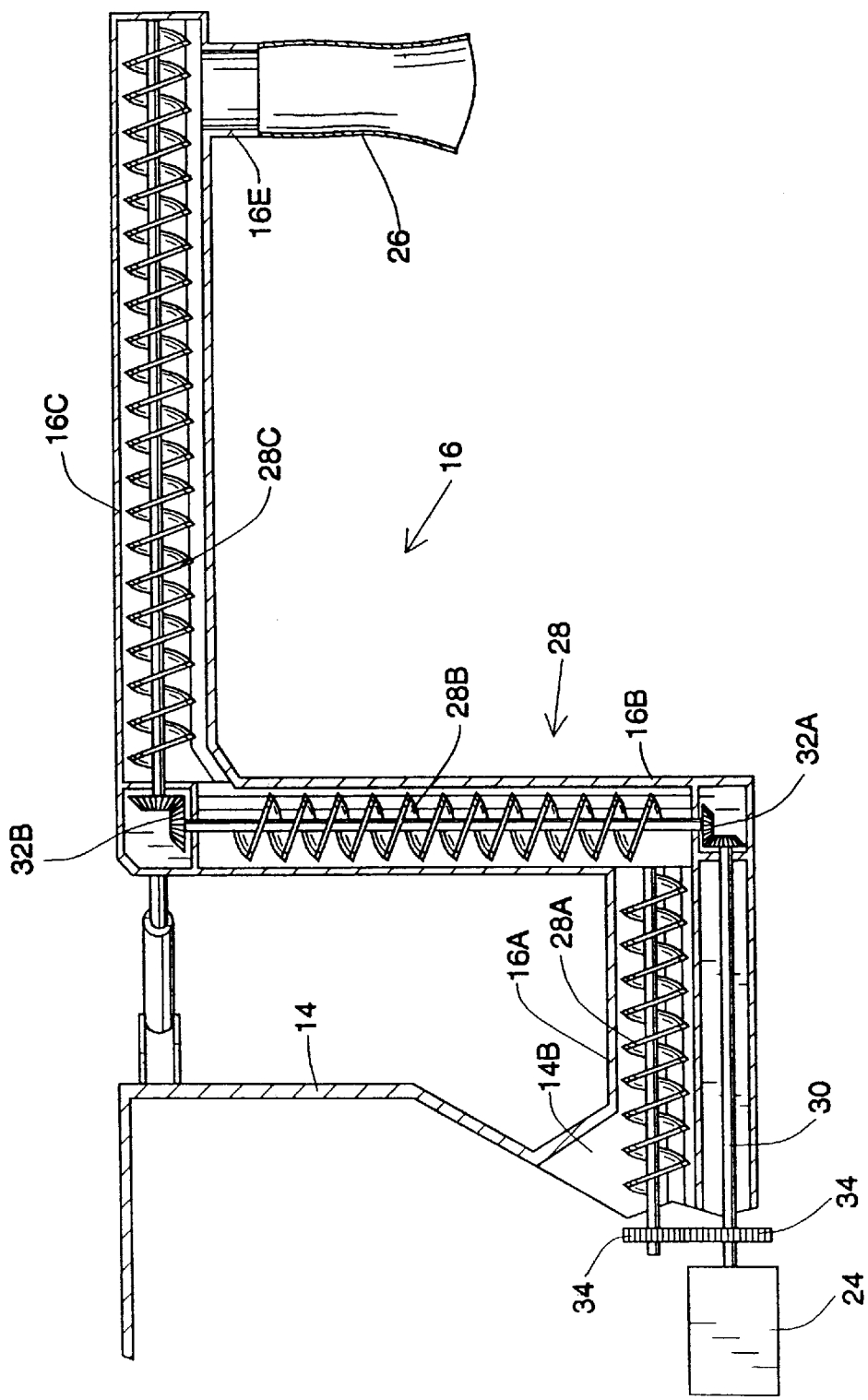
FIG. 3 is a cross-sectional view of the duct assembly taken along line 2—2.

FIG. 3 is a cross-sectional view of the duct assembly 16 taken along line 2—2 in FIG. 2. FIG. 3 shows series of augers 28 positioned within the duct assembly 16. The bedding materials are discharged through the chute 14B and into the duct 16A. The bedding materials are moved through duct 16A by auger 28A within duct 16A. Auger 28A is turned by motor 24 using gears 34. The bedding materials are moved through duct 16B by auger 28B. Auger 28B is driven by the motor 24 using axle 30 and beveled gears 32A. The bedding materials are moved through duct 16C by auger 28C. Auger 28C is driven by the turning of auger 28B through beveled gears 32B. The bedding materials are dispensed through chute 16E by gravity. An end of a flexible tube 26 is sealed around chute 16E to reduce scattering and dispersal of fine particulates of bedding materials.

Thus the self propelled bedding dispensing vehicle of the present invention provides an easily maneuverable machine that can mix, hold, carry and distribute bedding materials.

While the above description contains many specificities, these should not be construed as limitations on the scope of the invention, but rather as an exemplification of one preferred embodiment thereof. Many variations are possible. For example:

a. the augers used to convey the bedding materials may be replaced by a conveyor belt assembly;

b. an additional auger may be positioned within the chute to prevent clogging of the chute;

c. the mixing bin discharge chute may have a discharge door; and d. hydraulic controls may be used to operate the discharge door, augers, and mixing bin.

Accordingly, the scope of the invention should be determined not by the embodiment illustrated, but by the appended claims and their legal equivalents.

The invention claimed is:

1. A bedding installation vehicle, comprising:
   a. a vehicle having a cab;
   b. a bin attached to the vehicle, the bin having a bottom and a discharge chute;
   c. a first duct disposed outwardly from the discharge chute such that contents of the bin may be dispensed into the first duct;
   d. a rotating duct attached to the first duct such that the rotating duct is situated substantially in a vertical position;
   e. a dispensing duct having a second chute, the dispensing duct attached to the rotating duct at a substantially right angle using a connecting joint such that rotation of the rotating duct moves the dispensing duct in a substantially horizontal plane;
   f. a flexible tube sealed to the second chute;
   g. a series of augers positioned within the ducts for conveying bedding materials through the first, rotating, and dispensing ducts;
   h. a hydraulic piston having a first and second ends, the first end pivotally attached to the connecting joint, the second end pivotally attached to the bin such that extension of the piston rotates the rotating duct; and
   i. a means for controlling the piston, the means positioned inside the cab.

2. A bedding installation vehicle as in claim 1, wherein the means for controlling the piston is a hydraulic control system.

3. The bedding installation vehicle of claim 1 wherein the discharge chute is positioned at the bottom of the bin.

* * * * *